United States Patent
Wang et al.

(10) Patent No.: US 10,674,452 B2
(45) Date of Patent: *Jun. 2, 2020

(54) TERMINAL MANAGEMENT METHOD AND APPARATUS

(71) Applicant: HUAWEI TECHNOLOGIES CO., LTD., Shenzhen, Guangdong (CN)

(72) Inventors: Xilin Wang, Shenzhen (CN); Zhen Ye, Shenzhen (CN); Tao Yi, Shenzhen (CN); Xiangyang Wang, Xi'an (CN); Yanguo He, Xi'an (CN); Zexu Qian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/562,244

(22) Filed: Sep. 5, 2019

(65) Prior Publication Data

US 2019/0394724 A1    Dec. 26, 2019

Related U.S. Application Data

(63) Continuation of application No. 15/749,357, filed as application No. PCT/CN2017/073958 on Feb. 17, 2017, now Pat. No. 10,440,653.

(30) Foreign Application Priority Data

May 24, 2016  (CN) .......................... 2016 1 0353630

(51) Int. Cl.
*H04W 52/02* (2009.01)
*G06F 1/3234* (2019.01)
(Continued)

(52) U.S. Cl.
CPC .......... *H04W 52/027* (2013.01); *G06F 1/163* (2013.01); *G06F 1/3206* (2013.01);
(Continued)

(58) Field of Classification Search
None
See application file for complete search history.

(56) References Cited

U.S. PATENT DOCUMENTS 8,265,610 B1 * 9/2012 Delker ............... G06Q 30/0201
                                                          455/414.1
8,543,403 B1 * 9/2013 Youngs ............... H04M 3/2281
                                                          704/251
(Continued)

FOREIGN PATENT DOCUMENTS

CA       2661689 A1    11/2009
CN    102883061 A      1/2013
(Continued)

OTHER PUBLICATIONS

Foreign Communication From a Counterpart Application, European Application No. 17801932.9, Extended EuropeanSearch Report dated Jul. 31, 2018, 8 pages.
(Continued)

*Primary Examiner* — Mohammed Rachedine
(74) *Attorney, Agent, or Firm* — Fish & Richardson P.C.

(57) ABSTRACT

A terminal management method and an apparatus, where the method includes that a terminal obtains a first light intensity at a first moment and a second light intensity at a second moment according to a first interval period. The second moment is later than the first moment. When a difference between the first light intensity and the second light intensity is greater than a first threshold, and the second light intensity is less than a second threshold, the terminal closes a target program.

20 Claims, 5 Drawing Sheets

(51) Int. Cl.
*G06F 1/3206* (2019.01)
*G06F 1/16* (2006.01)

(52) U.S. Cl.
CPC .......... *G06F 1/3234* (2013.01); *G06F 1/3265* (2013.01); *H04W 52/0225* (2013.01); *H04W 52/0251* (2013.01); *H04W 52/0264* (2013.01); *Y02D 10/153* (2018.01); *Y02D 70/00* (2018.01); *Y02D 70/1224* (2018.01); *Y02D 70/1262* (2018.01); *Y02D 70/142* (2018.01); *Y02D 70/144* (2018.01); *Y02D 70/26* (2018.01)

(56) References Cited

U.S. PATENT DOCUMENTS

| | | | | |
|---|---|---|---|---|
| 9,516,726 | B2* | 12/2016 | Ogawa | G04G 11/00 |
| 2005/0225983 | A1* | 10/2005 | Fornell | H05B 47/10 |
| | | | | 362/276 |
| 2008/0067955 | A1 | 3/2008 | Cunningham et al. | |
| 2013/0252597 | A1 | 9/2013 | Jin et al. | |
| 2014/0253326 | A1* | 9/2014 | Cho | G08B 7/066 |
| | | | | 340/539.13 |

FOREIGN PATENT DOCUMENTS

| | | |
|---|---|---|
| CN | 103037088 A | 4/2013 |
| CN | 103414834 A | 11/2013 |
| CN | 104199670 A | 12/2014 |
| CN | 104469022 A | 3/2015 |
| CN | 105430729 A | 3/2016 |
| CN | 105446473 A | 3/2016 |

OTHER PUBLICATIONS

Foreign Communication From a Counterpart Application, PCT Application No. PCT/CN2017/073958, English Translation of International Search Report dated May 9, 2017, 2 pages.
Machine Translation and Abstract of Chinese Publication No. CN102883061, Jan. 16, 2013, 12 pages.
Machine Translation and Abstract of Chinese Publication No. CN103037088, Apr. 10, 2013, 22 pages.
Machine Translation and Abstract of Chinese Publication No. CN103414834, Nov. 27, 2013, 15 pages.
Machine Translation and Abstract of Chinese Publication No. CN104199670, Dec. 10, 2014, 12 pages.
Machine Translation and Abstract of Chinese Publication No. CN104469022, Mar. 25, 2015, 14 pages.
Office Action issued in Chinese Application No. 201610353630.6 dated May 27, 2019, 15 pages (with English translation).

* cited by examiner

TERMINAL MANAGEMENT METHOD AND APPARATUS

CROSS-REFERENCE TO RELATED APPLICATIONS

This application is a continuation of U.S. patent application Ser. No. 15/749,357, filed on Jan. 31, 2018, which is a National Stage of International Patent Application No. PCT/CN2017/073958, filed on Feb. 17, 2017, which claims priority to Chinese Patent Application No. 201610353630.6, filed on May 24, 2016. All of the aforementioned applications are hereby incorporated by reference in their entireties.

TECHNICAL FIELD

This application relates to the communications field, and in particular, to a terminal management method and an apparatus.

BACKGROUND

With development of science and technologies, intelligent wearable devices such as a smartwatch are becoming increasingly popular. A smartwatch worn by a user is usually hidden in a sleeve in most time, and the user raises the wrist to view and operate the smartwatch only when needed, for example, reading time.

In other approaches, for an aesthetic purpose, a smartwatch usually keeps a screen lit up after it is powered on. However, a display screen is a high power-consuming component. If the screen is constantly on, a large amount of power is consumed, and a standby time of the smartwatch is greatly shortened.

SUMMARY

Embodiments of this application provide a terminal management method and an apparatus in order to reduce running power consumption of a terminal and increase a standby time of the terminal.

In view of this, a first aspect of this application provides a terminal management method, including obtaining, by a terminal, a first light intensity at a first moment and a second light intensity at a second moment according to a first interval period, where the second moment is later than the first moment, and closing, by the terminal, a target program when a difference between the first light intensity and the second light intensity is greater than a first threshold, and the second light intensity is less than a second threshold.

In this embodiment of this application, the terminal obtains the first light intensity at the first moment and the second light intensity at the second moment according to the first interval period, where the second moment is later than the first moment, and the terminal closes the target program when the difference between the first light intensity and the second light intensity is greater than the first threshold, and the second light intensity is less than the second threshold. It can be learnt from above that, the terminal can determine, according to a variation in light intensities, whether the terminal is blocked by clothes, and close the target program. This reduces running power consumption of the terminal and increases a standby time of the terminal.

In a possible design, the terminal obtains a third light intensity at a third moment according to a second interval period, and the terminal starts the target program when the third light intensity is greater than a third threshold.

In this embodiment of this application, the terminal may determine, according to the third light intensity obtained at the third moment, whether the terminal exits a clothes-blocked state, and may start the target program. The target program herein may be the foregoing closed target program. Based on this, an intelligent service of the terminal can be implemented, and user experience can be effectively improved.

Optionally, the terminal may set a polling interval, where the polling interval includes the first interval period and the second interval period, and duration of the second interval period is greater than duration of the first interval period.

In this embodiment of this application, to effectively save energy, the terminal may set different polling intervals for detecting whether the terminal enters a clothes-blocked state and whether the terminal exits the clothes-blocked state. In addition, to avoid an energy waste caused by frequent light intensity detection, the polling interval is set so that the duration of the second interval period is greater than the duration of the first interval period, that is, after the terminal is blocked by clothes, duration of an interval period for detecting and obtaining a light intensity is longer.

In addition, two polling intervals may be set as follows.

(a) A first interval period, for example, detected duration from screen on to screen off, may be 160 milliseconds (ms); and (b) A second interval period, for example, detected duration from screen off to screen on, may be 1 second (s).

Optionally, the terminal sets an ambient light detection template, where the ambient light detection template includes a first parameter and a second parameter, the first parameter is used to indicate that the terminal is in a blocked state, and the second parameter is used to indicate that the terminal is in an unblocked state. The first parameter includes that a difference between ambient light intensities obtained by the terminal for two times is greater than the first threshold, and that a secondly-obtained ambient light intensity of the ambient light intensities obtained by the terminal for two times is less than the second threshold. The second parameter includes that an ambient light intensity obtained by the terminal is less than the third threshold. The ambient light intensities obtained by the terminal include the first light intensity, the second light intensity, and the third light intensity, and the first threshold is 3 lux, the second threshold is 0.625 lux, and the third threshold is 1.25 lux.

In this embodiment of this application, the terminal may set the ambient light detection template to match and determine the obtained light intensities, where the template may include the first parameter and the second parameter that may be set as follows.

A. The first parameter includes the following.

(a) A variation in the ambient light intensities detected for two times is great than 3 lux, that is, the first threshold is 3 lux; and (b) A value of the secondly-detected ambient light intensity is less than 0.625 lux, that is, the second threshold is 0.625 lux.

B. The second parameter includes the following.

A value of the detected ambient light intensity is greater than 1.25 lux, that is, the third threshold is set to 1.25 lux.

The foregoing data is obtained through a large number of experiments and statistics. Based on the specified ambient light detection template, the terminal can effectively determine a status change of the terminal.

Optionally, when the difference between the first light intensity and the second light intensity is greater than the first threshold, and the second light intensity is less than the second threshold, the terminal determines that the terminal is in the blocked state, and executes a first power management policy, where the first power management policy is used to close a target program, and when the third light intensity is greater than the third threshold, the terminal determines that the terminal is in the unblocked state, and executes a second power management policy, where the second power management policy is used to start the target program.

Optionally, the terminal may store the obtained ambient light intensities into a queue, where a length of the queue is not less than 2.

In this embodiment of this application, the terminal determines a status of the terminal according to a variation in the ambient light intensities detected for two times in order to close the target program. Therefore, the terminal needs to store at least the ambient light intensities obtained for two times in order to determine a variation in the light intensities.

A second aspect of this application provides a terminal apparatus, including an obtaining module configured to obtain a first light intensity at a first moment and a second light intensity at a second moment according to a first interval period, where the second moment is later than the first moment, and a close module configured to close a target program when a difference between the first light intensity and the second light intensity is greater than a first threshold, and the second light intensity is less than a second threshold.

In a possible design, the obtaining module is further configured to obtain a third light intensity at a third moment according to a second interval period, and the apparatus further includes a start module configured to start the target program when the third light intensity is greater than a third threshold. Optionally, the apparatus further includes a setting module configured to set a polling interval, where the polling interval includes the first interval period and the second interval period, and duration of the second interval period is greater than duration of the first interval period.

Optionally, the setting module is further configured to set an ambient light detection template, where the ambient light detection template includes a first parameter and a second parameter, the first parameter is used to indicate that the terminal is in a blocked state, and the second parameter is used to indicate that the terminal is in an unblocked state. The first parameter includes that a difference between ambient light intensities obtained by the terminal for two times is greater than the first threshold, and that a secondly-obtained ambient light intensity of the ambient light intensities obtained by the terminal for two times is less than the second threshold. The second parameter includes that an ambient light intensity obtained by the terminal is less than the third threshold. The ambient light intensities obtained by the terminal include the first light intensity, the second light intensity, and the third light intensity, and the first threshold is 3 lux, the second threshold is 0.625 lux, and the third threshold is 1.25 lux.

Optionally, the close module is further configured to determine that the terminal is in the blocked state, and execute a first power management policy when the difference between the first light intensity and the second light intensity is greater than the first threshold, and the second light intensity is less than the second threshold, where the first power management policy is used to close the target program, and when the third light intensity is greater than the third threshold, the start module is further configured to determine that the terminal is in the unblocked state, and execute a second power management policy, where the second power management policy is used to start the target program.

Optionally, the apparatus further includes a storage module configured to store the obtained ambient light intensities into a queue, where a length of the queue is not less than 2.

A third aspect of this application provides a terminal apparatus, including an input unit, a display unit, a sensor, a processor, and a memory, where the processor performs, using the sensor, the following steps of obtaining a first light intensity at a first moment and a second light intensity at a second moment according to a first interval period, where the second moment is later than the first moment, and closing a target program when a difference between the first light intensity and the second light intensity is greater than a first threshold, and the second light intensity is less than a second threshold.

In a possible design, the processor is further configured to perform, using the sensor the following steps of obtaining a third light intensity at a third moment according to a second interval period, and starting the target program when the third light intensity is greater than a third threshold.

A fourth aspect of this application provides a computer readable storage medium configured to store a computer program, where the computer program includes an instruction that is used to execute at least one method described in the first aspect and all possible designs of the first aspect.

In the technical solutions according to the embodiments of this application, the terminal obtains the first light intensity at the first moment and the second light intensity at the second moment according to the first interval period, where the second moment is later than the first moment, and when the difference between the first light intensity and the second light intensity is greater than the first threshold, and the second light intensity is less than the second threshold, the terminal closes the target program. It can be learnt from above that, the terminal can determine, according to a variation in light intensities, whether the terminal is blocked by clothes, and close the target program. This reduces running power consumption of the terminal and increases a standby time of the terminal.

DESCRIPTION OF EMBODIMENTS

The following clearly describes the technical solutions in the embodiments of the present application with reference to the accompanying drawings in the embodiments of the present application. The described embodiments are merely some but not all of the embodiments of the present application. All other embodiments obtained by persons of ordinary skill in the art based on the embodiments of the present application without creative efforts shall fall within the protection scope of the present application.

In the specification, claims, and accompanying drawings of this application, the terms "first," "second," "third," "fourth," and the like (if existent) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include," "contain," and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

The embodiments of this application provide a terminal management method and an apparatus in order to reduce running power consumption of a terminal and increase a standby time of the terminal. Details are described below.

Figure 1:
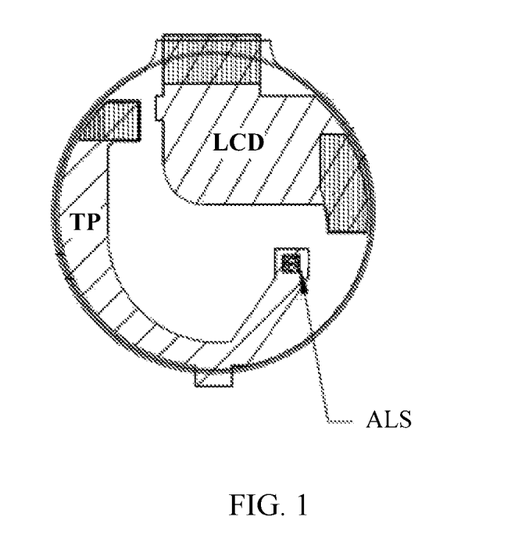
FIG. 1 is a schematic plan view of a smartwatch according to an embodiment of this application.
Figure 2:
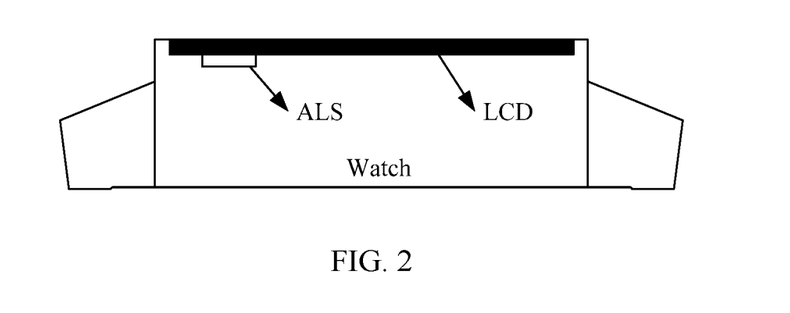
FIG. 2 is a schematic side cross-sectional view of a smartwatch according to an embodiment of this application.

The terminal in the embodiments of this application includes but is not limited to a mobile phone, a tablet computer, a palmtop computer, and intelligent wearable devices such as a smartwatch and a smart band. The smartwatch may generally include two parts, a liquid crystal display (LCD) and a touch panel (TP), as shown in FIG. 1. In addition, an ambient light sensor (ALS) may be installed on a circuit board at which the TP is located. The ALS is installed right below the LCD, as shown in FIG. 2. In addition, in the embodiments of this application, an organic light-emitting diode (OLED) may be selected as the LCD of the terminal. A display using an OLED technology can be thin and light, and does not use backlight in order to prevent LCD light from affecting accuracy of ambient light detection by the ALS.

It should be noted that an application scenario described in the embodiments of this application is intended to describe the technical solutions in the embodiments of this application more clearly, and does not constitute limitations to the technical solutions in the embodiments of this application. Persons of ordinary skill in the art may know that, with development of LCD technologies and other combination manners of the ALS and the LCD, the technical solutions provided in the embodiments of this application are also applicable to similar technical issues.

Figure 3:
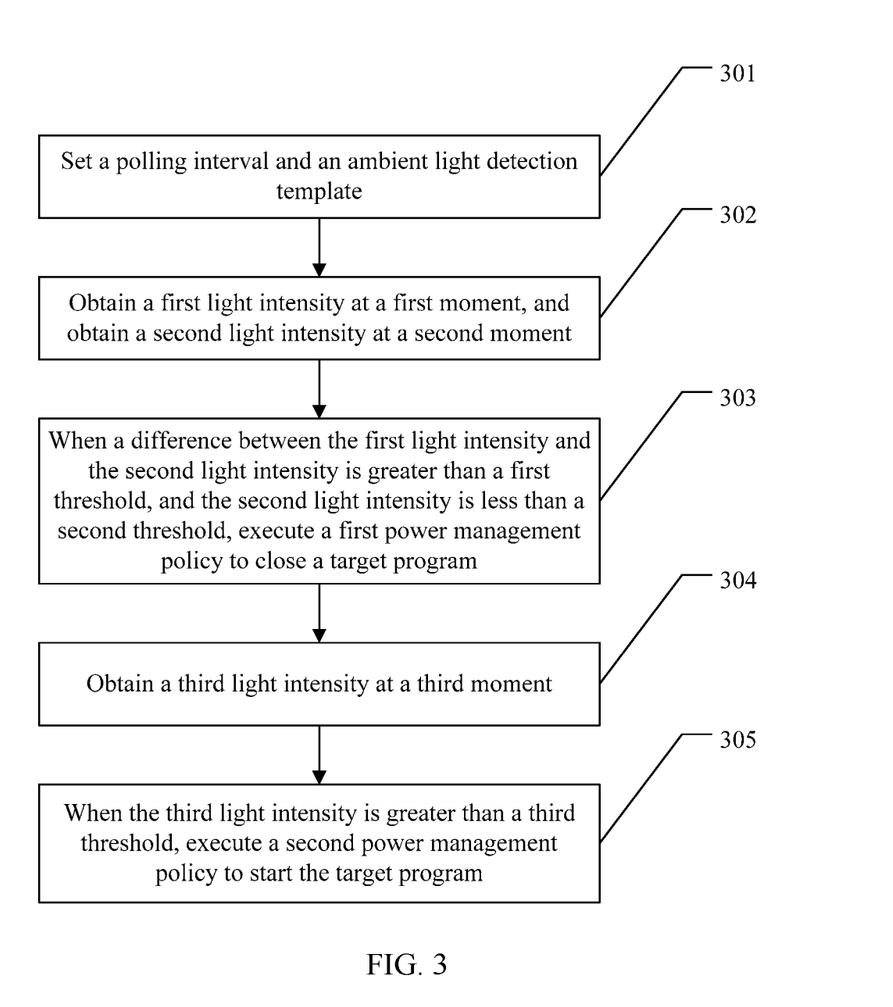
FIG. 3 is a schematic flowchart diagram of an embodiment of a terminal management method according to embodiments of this application.

In the embodiments of this application, when the terminal is used by a user, the terminal may be in a blocked state or in an unblocked state. For example, when the user leaves the smartwatch unused and hidden in a sleeve, the smartwatch is in the blocked state, and the smartwatch is in the unblocked state when the user raises the wrist to expose the smartwatch from the sleeve. The terminal may determine, by detecting an ambient light intensity, whether the terminal is in the blocked state or in the unblock status. Specific steps are shown below. Referring to FIG. 3, an embodiment of a terminal management method according to the embodiments of this application includes the following steps.

Step 301: Set a polling interval and an ambient light detection template.

In this embodiment, the terminal may detect an ambient light intensity using an ALS. The ambient light intensity is a light intensity of ambient light, in unit of lux. The terminal may set an interval period for obtaining an ambient light intensity detected by the ALS. The interval period may be the polling interval. Polling refers to a manner in which a central processing unit (CPU) determines how to serve a peripheral equipment, and may also be referred to as programmed input/output (I/O). In this embodiment, the CPU may regularly send a query to periodically obtain the ambient light intensity detected by the ALS.

It can be understood that the terminal may set the polling interval to a first interval period and a second interval period. When the terminal detects that the terminal is in the unblocked state, the terminal may set the interval period for obtaining the ambient light intensity to the first interval period, and the terminal may set the interval period for obtaining the ambient light intensity to the second interval period when the terminal detects that the terminal is in the blocked state. It can be understood that, in an actual application, the terminal may set duration of the first interval period to be less than duration of the second interval period.

In this embodiment, the terminal may further preset the ambient light detection template. The ambient light detection template may include a preset ambient light intensity parameter of an unblocked terminal and a preset ambient light intensity parameter of a blocked terminal. It can be understood that when a value of the ambient light intensity obtained by the terminal using the ALS matches the preset ambient light intensity parameter of the unblocked terminal, the terminal determines that the terminal is in the unblocked state, and the terminal determines that the terminal is in the blocked state when the value of the ambient light intensity obtained by the terminal using the ALS matches the preset ambient light intensity parameter of the blocked terminal.

It should be noted that the terminal may store values of the ambient light intensities detected by the ALS in a queue. The queue may be a special linear table, characterized in that a deletion operation is allowed to be performed only at the front of the table (a location to which a queue front pointer front points), and that an insertion operation is allowed to be performed only at the rear of the table (a location to which a queue rear pointer rear points). A format of the queue may be shown in Table 1.

TABLE 1

| 0 | 1 | 2 | 3 |
|---|---|---|---|
| Front | | | |
| Rear | | | |

It is assumed that values of the ambient light intensities detected by the terminal using the ALS for the first four times are A, B, C, and D. The terminal may store the values A, B, C, and D into a queue in sequence. In this case, the queue rear pointer rear moves to an end item, that is, an item numbered 3, as shown in Table 2.

TABLE 2

| 0 | 1 | 2 | 3 |
|---|---|---|---|
| A | B | C | D |
| Front | | | Rear |

When a value of the ambient light intensity detected by the terminal at a fifth time using the ALS is E, and the terminal stores the value E into the queue, the terminal may first delete the value A, shown in Table 2, in an item to which the queue front pointer front points, and then insert the value E into an item to which the queue rear pointer rear points, as shown in Table 3.

TABLE 3

| 0 | 1 | 2 | 3 |
|---|---|---|---|
| B | C | D | E |
| Front | | | Rear |

Step 302: Obtain a first light intensity at a first moment, and obtain a second light intensity at a second moment.

In this embodiment, at a moment when the terminal lights the screen up, the terminal may start periodically obtaining, according to the preset first interval period, the ambient light intensity detected by the ALS. It should be noted that the terminal lights the screen up herein may be lighting the screen up when the terminal detects a user wrist motion status using an acceleration sensor, a gyroscope sensor, or an acceleration-gyroscope sensor, that is, the terminal detects that the user raises the wrist. It can be understood that the terminal may also light the screen up by receiving an instruction triggered by tapping the screen or pressing a button by a user. This is not limited herein.

In this embodiment, the terminal periodically obtains the ambient light intensities according to the first interval period, and may store the obtained ambient light intensities into a queue. In a queue shown in Table 4, a length of the queue is 2, that is, ambient light intensities obtained by the terminal at two adjacent moments are stored, as shown in the following table.

TABLE 4

| 0 | 1 |
|---|---|
| A | B |
| Front | Rear |

In Table 4, an item numbered 0 may be understood as the ambient light intensity obtained by the terminal at the first moment, and a letter A is the first light intensity obtained by the terminal at the first moment. In Table 4, an item numbered 1 may be understood as the ambient light intensity obtained by the terminal at the second moment, and a letter B is the second light intensity obtained by the terminal at the second moment.

It can be understood that the first moment and the second moment may be two moments at which the terminal periodically obtains the ambient light intensities according to the first interval period. Interval duration between the first moment and the second moment may be the duration of the first interval period, and the first moment may be earlier than the second moment.

It should be noted that, in an actual application, the terminal may set the first interval period to 160 ms. It can be understood that 160 ms may be a preferred value obtained through an experiment. It can be understood that, in an actual application, the terminal may set the first interval period to a value other than 160 ms, for example, 10 ms, 100 ms, or 1 s. This is not limited herein.

Step 303: When a difference between the first light intensity and the second light intensity is greater than a first threshold, and the second light intensity is less than a second threshold, execute a first power management policy to close a target program.

In this embodiment, in the ambient light detection template preset by the terminal, an ambient light intensity parameter of the blocked terminal may be that the variation between the ambient light intensities obtained by the terminal for two times is greater than the first threshold, and that the secondly-obtained ambient light intensity of the ambient light intensities obtained by the terminal for two times is less than the second threshold.

The terminal may calculate the variation between the first light intensity and the second light intensity obtained in the foregoing step 302, which may further be calculating a difference obtained by subtracting the second light intensity from the first light intensity. The first light intensity may be greater than the second light intensity. It should be noted that, in this application, a difference between the first light intensity and the second light intensity obtained through calculation using another calculation method should also fall within the protection scope of this application.

In this embodiment, when the terminal detects that the difference between the first light intensity and the second light intensity obtained through calculation is greater than the first threshold, and that the second light intensity is less than the second threshold, the terminal may determine that the first light intensity and the second light intensity match the preset ambient light intensity parameter of the blocked terminal in the ambient light detection template, that is, the terminal may determine that the terminal is in the blocked state.

It should be noted that, in an actual application, the terminal may set the first threshold to 3 lux, and set the second threshold to 0.625 lux. The set values may be preferred values obtained through an experiment. It can be understood that, in an actual application, the first threshold set by the terminal includes but is not limited to 3 lux, the second threshold set by the terminal includes but is not limited to 0.625 lux, and the first threshold and the second threshold may be set to other values. For example, the terminal may set the first threshold to 1 lux or 10 lux, and set the second threshold to 0.001 lux, 0.01 lux, 0.1 lux, 1 lux, or the like. This is not limited herein.

It should be noted that the terminal may execute the first power management policy after determining that the terminal is in the blocked state. The first power management policy includes closing a target program that consumes energy and switching an interval of obtaining the ambient light intensity from the first interval period to the second interval period. The target program may be a screen display program. It can be understood that the target program closed by the terminal may alternatively be a gesture recognition program, a touch sensing program, or a fingerprint identification program. This is not limited herein.

Step 304: Obtain a third light intensity at a third moment.

In this embodiment, after executing the first power management policy, the terminal may start periodically obtaining, according to the preset second interval period, the ambient light intensity detected by the ALS. The terminal may store the obtained ambient light intensity into a queue, as shown in Table 5.

TABLE 5

| 0 | 1 |
|---|---|
| C | D |
| Front | Rear |

In Table 5, an item numbered 1 may be understood as the ambient light intensity obtained by the terminal at the third moment, and a letter D is the third light intensity obtained by the terminal at the third moment.

It should be noted that, in an actual application, the terminal may set the second interval period to 1 s. It can be understood that 1 s may be a preferred value obtained through an experiment. It can be understood that, in an actual application, the terminal may set the second interval period to a value other than 1 s, for example, 0.1 s, 5 s, or 10 s. This is not limited herein.

Step 305: When the third light intensity is greater than a third threshold, execute a second power management policy to start the target program.

In this embodiment, in the ambient light detection template preset by the terminal, the ambient light intensity parameter of the unblocked terminal may be that the ambient light intensity obtained by the terminal is greater than the third threshold.

In this embodiment, the terminal may detect whether the obtained third light intensity is greater than the third threshold. When the terminal detects that the third light intensity is greater than the third threshold, the terminal may determine that the third light intensity matches the preset ambient light intensity parameter of the unblocked terminal in the ambient light detection template, that is, the terminal may determine that the terminal is in the unblocked state.

It should be noted that, in an actual application, the terminal may set the third threshold to 1.25 lux. The set value may be a preferred value obtained through an experiment. It can be understood that, in an actual application, the third threshold set by the terminal includes but is not limited to 1.25 lux. The third threshold may be set to another value such as 1 lux, 2 lux, or 5 lux. This is not limited herein.

It should be noted that, the terminal may execute the second power management policy after determining that the terminal is in the unblocked state. The second power management policy includes starting the target program closed in the foregoing step 303 and switching an interval of obtaining the ambient light intensity from the second interval period to the first interval period.

It should be noted that, in an actual application, the terminal may return to perform step 302 after performing step 305, and the terminal may perform step 302 to step 305 cyclically.

In this embodiment of this application, the terminal obtains the first light intensity at the first moment and the second light intensity at the second moment according to the first interval period, where the second moment is later than the first moment, and the terminal closes the target program when the difference between the first light intensity and the second light intensity is greater than the first threshold, and the second light intensity is less than the second threshold. It can be learnt from above that, the terminal can determine, according to a variation in light intensities, whether the terminal is blocked by clothes, and close the target program. This reduces running power consumption of the terminal and increases a standby time of the terminal.

Figure 4:
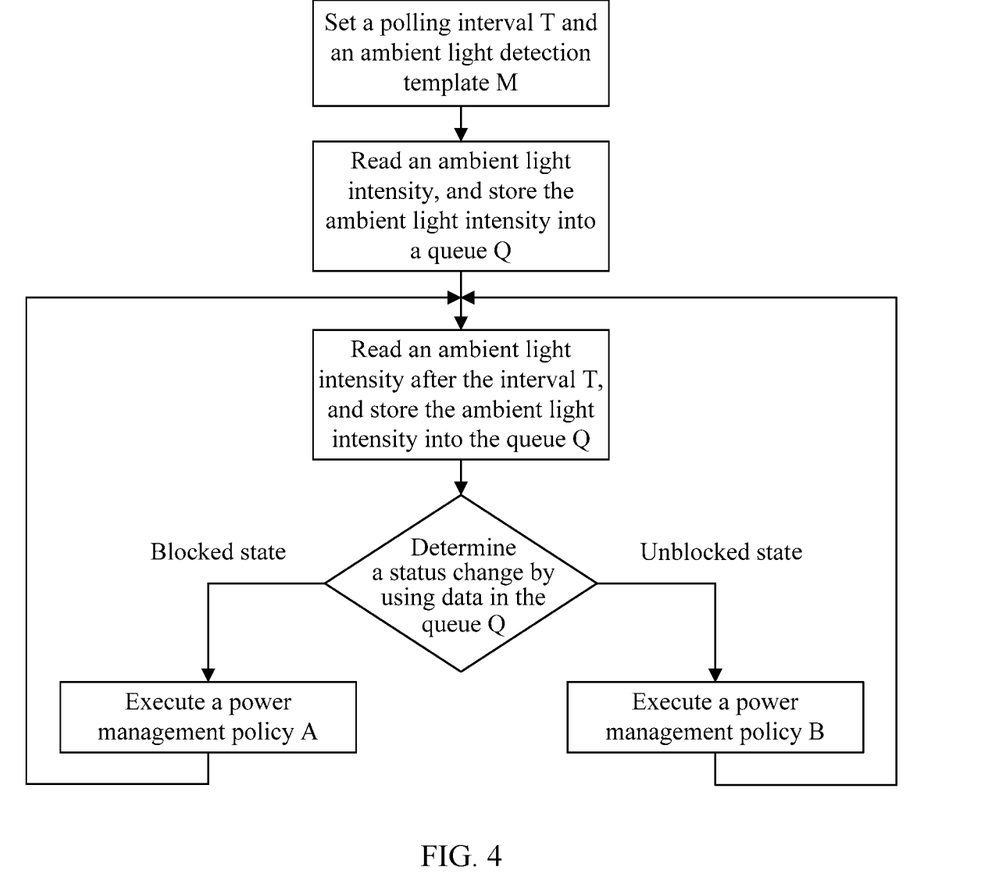
FIG. 4 is a schematic flowchart of a software algorithm according to an embodiment of this application.

To execute the terminal management method in this embodiment of this application, this application provides a software algorithm process. The following is described using an example in which a smartwatch controls on and off of a display screen. Referring to FIG. 4, the software algorithm process may include the following steps.

Step S1: Set a polling interval T and an ambient light detection template M.

The polling interval T may be set as follows.

(a) A first interval period is 160 ms, that is, detected duration from screen on to screen off is 160 ms; and (b) A second interval period is 1 s, that is, detected duration from screen off to screen on is 1 s.

In addition, the ambient light detection template M may include two parameters, including an ambient light intensity parameter A of a blocked smartwatch and an ambient light intensity parameter B of an unblocked terminal.

The parameter A includes the following.

(a) A variation between ambient light intensities detected for two times is greater than 3 lux, and (b) A value of a secondly-detected ambient light intensity is less than 0.625 lux.

The parameter B includes the following.

(a) A value of a detected ambient light intensity is greater than 1.25 lux.

Step S2: Read an ambient light intensity once at intervals of T, and store the read ambient light intensity into a queue Q.

When a user lights the display screen of the smartwatch up, the smartwatch starts reading an ambient light intensity detected by an ALS once at intervals of T. In this case, T is the first interval period, that is, 160 ms. The smartwatch stores the read ambient light intensity into the queue Q. A length of the queue Q is 2, that is, the ambient light intensities detected for two adjacent times are stored.

Step S3: Determine a status change using data in the queue Q to match a parameter in the ambient light detection template M.

When a difference between the ambient light intensities that are detected for two times and that are stored in the queue Q is greater than 3 lux, and the value of the secondly-detected ambient light intensity is less than 0.625 lux, the difference and the value match the parameter A in the ambient light detection template M, and it can be determined that the smartwatch is in a blocked state.

When the value of the ambient light intensity stored into the queue Q is greater than 1.25 lux, the value matches the parameter B in the ambient light detection template M, and it can be determined that the smartwatch is in an unblocked state.

Step S4: Execute a power management policy A when a status is a blocked state, otherwise, perform step S5.

The power management policy A is executed to turn off the display screen and switch T from 160 ms to 1 s.

Step S5: Execute a power management policy B when a status is an unblocked state, otherwise, perform step S2.

The power management policy B is executed to turn on the display screen and switch T from 1 s to 160 ms.

It should be noted that the foregoing software algorithm process is the same as the method steps described in the method embodiment of this application. Therefore, details are not described again in this embodiment.

Figure 5:
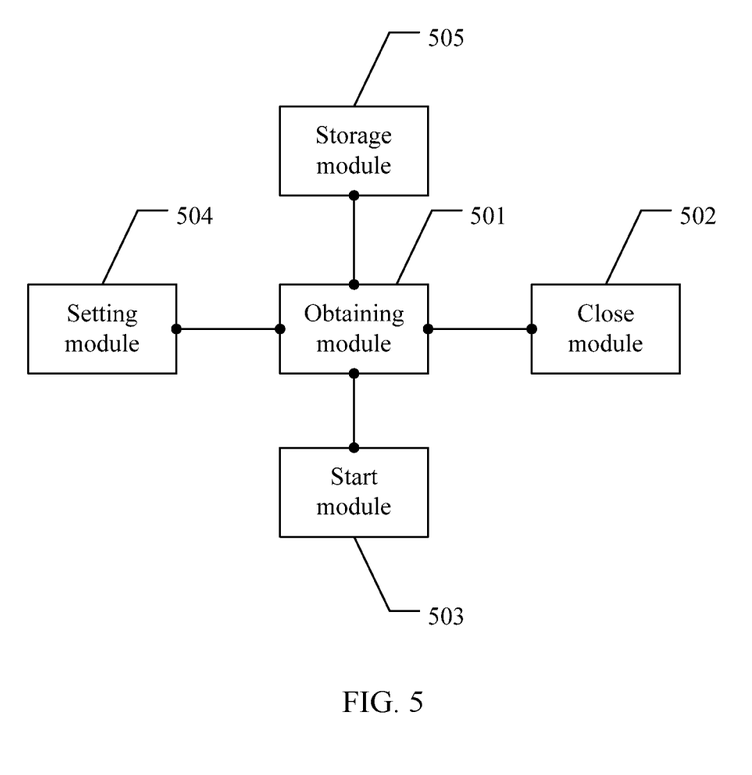
FIG. 5 is a schematic diagram of an embodiment of a terminal apparatus according to embodiments of this application.

The foregoing describes the terminal management method in the embodiments of this application. The following describes a terminal apparatus according to an embodiment of this application. Referring to FIG. 5, an embodiment of a terminal apparatus in the embodiments of this application includes an obtaining module 501 configured to obtain a first light intensity at a first moment and a second light intensity at a second moment according to a first interval period, where the second moment is later than the first moment, and a close module 502 configured to close a target program when a difference between the first light intensity and the second light intensity is greater than a first threshold, and the second light intensity is less than a second threshold.

Optionally, the terminal apparatus in this embodiment of this application may further include that the obtaining module 501 is further configured to obtain a third light intensity at a third moment according to a second interval period, and a start module 503 is configured to start the target program when the third light intensity is greater than a third threshold.

Optionally, the terminal apparatus in this embodiment of this application may further include a setting module 504 configured to set a polling interval, where the polling interval includes the first interval period and the second interval period, and duration of the second interval period is greater than duration of the first interval period.

Optionally, the terminal apparatus in this embodiment of this application may further include that the setting module 504 is further configured to set an ambient light detection template, where the ambient light detection template includes a first parameter and a second parameter, the first parameter is used to indicate that the terminal is in a blocked state, and the second parameter is used to indicate that the terminal is in an unblocked state. The first parameter includes that a difference between ambient light intensities obtained by the terminal for two times is greater than the first threshold, and that a secondly-obtained ambient light intensity of the ambient light intensities obtained by the terminal for two times is less than the second threshold. The second parameter includes that an ambient light intensity obtained by the terminal is less than the third threshold. The ambient light intensities obtained by the terminal include the first light intensity, the second light intensity, and the third light intensity, and the first threshold is 3 lux, the second threshold is 0.625 lux, and the third threshold is 1.25 lux.

Optionally, the terminal apparatus in this embodiment of this application may further include that the close module 502 is further configured to determine that the terminal is in the blocked state, and execute a first power management policy when the difference between the first light intensity and the second light intensity is greater than the first threshold, and the second light intensity is less than the second threshold, where the first power management policy is used to close the target program, and the start module 503 is further configured to determine that the terminal is in the unblocked state, and execute a second power management policy when the third light intensity is greater than the third threshold, where the second power management policy is used to start the target program.

Optionally, the terminal apparatus in this embodiment of this application may further include a storage module 505 configured to store the obtained ambient light intensities into a queue, where a length of the queue is not less than 2.

In this embodiment of this application, the obtaining module 501 obtains the first light intensity at the first moment and the second light intensity at the second moment according to the first interval period, where the second moment is later than the first moment. When the difference between the first light intensity and the second light intensity is greater than the first threshold, and the second light intensity is less than the second threshold, the close module 502 closes the target program. It can be learnt from above that, the terminal can determine, according to a variation in light intensities, whether the terminal is blocked by clothes, and close the target program. This reduces running power consumption of the terminal and increases a standby time of the terminal.

Figure 6:
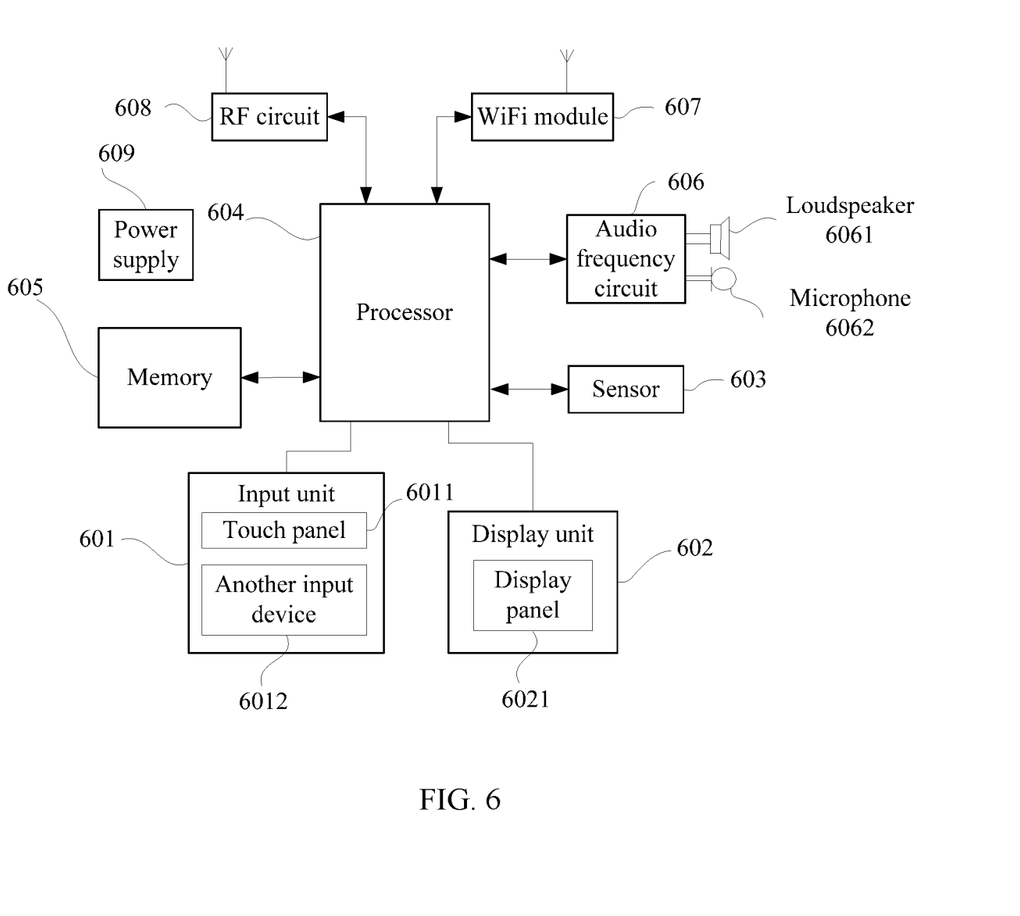
FIG. 6 is a schematic diagram of another embodiment of a terminal apparatus according to embodiments of this application.

The embodiments of this application further provide another terminal apparatus, as shown in FIG. 6. For ease of description, only a part related to the embodiment of this application is shown. For specific technical details not disclosed, refer to the method embodiment of this application. The terminal may be any terminal device such as a mobile phone, a tablet computer, a palmtop computer, a smartwatch, or a smart band. The smartwatch is used as an example.

FIG. 6 shows a block diagram of a partial structure of a smartwatch related to a terminal according to an embodiment of this application. As shown in FIG. 6, the smartwatch includes components such as an input unit 601, a display unit 602, a sensor 603, a processor 604, a memory 605, an audio frequency circuit 606, a WI-FI module 607, a radio frequency (RF) circuit 608, and a power supply 609. Persons of ordinary skill in the art can understand that the smartwatch structure shown in FIG. 6 does not constitute a limitation on the smartwatch, and the smartwatch may include more or fewer components than those shown in FIG. 6, a combination of some components, or the components disposed differently.

The following describes each component of the smartwatch in detail with reference to FIG. 6.

The RF circuit 608 may be configured to send or receive information, send or receive a signal during a call, and specially, receive downlink information of a base station and send the downlink information to the processor 604 for processing, and send related uplink data to the base station. Generally, the RF circuit 608 includes but is not limited to an antenna, at least one amplifier, a transceiver, a coupler, a low noise amplifier (LNA), a duplexer, and the like. In addition, the RF circuit 608 may also communicate with a network and another device by means of wireless communications. Any communications standard or protocol may be used in wireless communications, including but not limited to the Global System for Mobile Communications (GSM), general packet radio service (GPRS), Code Division Multiple Access (CDMA), Wideband CDMA (WCDMA), Long Term Evolution (LTE), an electronic mail (e-mail), a short message service (SMS), and the like.

The memory 605 may be configured to store a software program and a module. The processor 604 executes various function applications of the smartwatch and processes data by running the software program and module stored in the memory 605. The memory 605 may mainly include a program storage area and a data storage area. The program storage area may store an operating system, an application program required by at least one function (for example, an audio playback function and an image playback function), and the like. The data storage area may store data (for example, audio data and a phone book) created according to usage of the smartwatch, and the like. In addition, the memory 605 may include a high-speed random access memory (RAM), and may further include a non-volatile memory, for example, at least one disk storage device, a flash memory device, or another volatile solid-state storage device.

The input unit 601 may be configured to receive input digital or character information and generate key signal input related to user setting and function control of the smartwatch. Further, the input unit 601 may include a TP 6011 and an input device 6012. The TP 6011, also referred to as a touchscreen, may collect a touch operation performed by a user on the TP 6011 or near the TP 6011 (for example, an operation performed on the TP 6011 or near the TP 6011 by the user using a finger, a stylus, or any other suitable object or accessory), and drive a corresponding connection apparatus according to a preset program. Optionally, the TP 6011 may include two parts, a touch detection apparatus and a touch controller. The touch detection apparatus detects a touch azimuth of the user, detects a signal brought by a touch operation, and transfers the signal to the touch controller. The touch controller receives touch information from the touch detection apparatus, converts the touch information into contact coordinates, and then sends the contact coordinates to the processor 604. The touch controller can also receive and execute a command sent by the processor 604. In addition, the TP 6011 may be implemented using multiple types, such as a resistive type, a capacitive type, an infrared type, and a surface acoustic wave type. In addition to the TP 6011, the input unit 601 may include the input device 6012. Further, the input device 6012 may include but is not limited to one or more of a physical keyboard, a function key (for example, a volume control key or an on/off key), a trackball, a mouse, a joystick, or the like.

The display unit 602 may be configured to display information entered by the user, or information provided for the user, and various menus of the smartwatch. The display unit 602 may include a display panel 6021. Optionally, the display panel 6021 may be configured in a form of an LCD, an OLED, or the like. Further, the TP 6011 may cover the display panel 6021. After detecting a touch operation on or near the TP 6011, the TP 6011 transmits information about the touch operation to the processor 604 to determine a touch event type. Then, the processor 604 provides corresponding visual output on the display panel 6021 according to the touch event type. In FIG. 6, the TP 6011 and the display panel 6021 are used as two independent components to implement input and output functions of the smartwatch. However, in some embodiments, the TP 6011 and the display panel 6021 may be integrated to implement the input and output functions of the smartwatch.

The smartwatch may further include at least one sensor 603, such as a light sensor, a motion sensor, or another sensor. Further, the light sensor may include an ALS and a proximity sensor. The ALS may adjust luminance of the display panel 6021 according to brightness of ambient light. The proximity sensor may turn off the display panel 6021 and/or backlight when the smartwatch moves close to an ear. As a type of motion sensor, an accelerometer sensor may detect accelerations in various directions (three axes in general), may detect, in a still state, a value and a direction of gravity, and may be applied to a smartwatch posture recognition application (for example, a shake or a flip of the smartwatch, and magnetometer posture calibration), a vibration recognition related function (for example, a pedometer or tapping), and the like. Other sensors, such as a gyroscope, a barometer, a hygrometer, a thermometer, and an infrared sensor, may be further configured in the smartwatch, and details are not described herein.

The audio frequency circuit 606, a loudspeaker 6061, and a microphone 6062 may provide an audio interface between the user and the smartwatch. The audio frequency circuit 606 may transmit, to the loudspeaker 6061, an electrical signal that is obtained by converting received audio data. The loudspeaker 6061 converts the electrical signal into a sound signal and outputs the sound signal. In addition, the microphone 6062 converts a collected sound signal into an electrical signal. The audio frequency circuit 606 receives the electrical signal, converts it into audio data, and outputs the audio data to the processor 604 for processing. Then the processor 604 sends, using the RF circuit 608, the processed audio data to, for example, another smartwatch, or outputs the audio data to the memory 605 for further processing.

WI-FI is a short-distance wireless transmission technology. Using the WI-FI module 607, the smartwatch may help the user to send or receive an e-mail, browse a webpage, access streaming media, and the like. The WI-FI module 607 provides wireless broadband Internet access for the user. Although the WI-FI module 607 is shown in FIG. 6, it can be understood that the WI-FI module 607 is not a mandatory component of the smartwatch and may be omitted according to a requirement without changing the essence of the present disclosure.

The processor 604, a control center of the smartwatch, is connected to various parts of the entire smartwatch using various interfaces and lines, and executes various functions of the smartwatch and processes data by running or executing the software program and/or module stored in the memory 605 and invoking data stored in the memory 605 in order to perform overall monitoring on the smartwatch. Optionally, the processor 604 may include one or more processing units. Preferably, the processor 604 may integrate an application processor and a modem processor. The application processor mainly processes an operating system, a user interface, an application program, and the like. The modem processor mainly deals with wireless communications. It can be understood that the modem processor may alternatively not be integrated into the processor 604.

The smartwatch further includes the power supply 609 (for example, a battery) supplying power to each component. Preferably, the power supply 609 may be logically connected to the processor 604 using a power management system in order to implement functions such as charge and discharge management and power consumption management using the power management system.

Although not shown, the smartwatch may further include a camera, a BLUETOOTH module, or the like, and details are not described herein.

In this embodiment of this application, the processor 604 included in the terminal further has the following functions of obtaining a first light intensity at a first moment, and obtaining a second light intensity at a second moment, where the second moment is later than the first moment, and an interval period between the first moment and the second moment is a first interval period, and executing a first power management policy to close a target program when a difference between the first light intensity and the second light intensity is greater than a first threshold, and the second light intensity is less than a second threshold.

Optionally, in this embodiment of this application, the processor 604 included in the terminal further has the following functions of obtaining a third light intensity at a third moment, and obtaining a fourth light intensity at a fourth moment, where the fourth moment is later than the third moment, and an interval period between the third moment and the fourth moment is a second interval period, and executing a second power management policy to start a target program when a difference between the third light intensity and the fourth light intensity is greater than a third threshold.

It may be clearly understood by persons of ordinary skill in the art that, for the purpose of convenient and brief description, for the foregoing software algorithm process and a detailed working process of the apparatus and unit, refer to a corresponding process in the foregoing method embodiments, and details are not described herein again.

In the several embodiments provided in the present application, it should be understood that the disclosed software algorithm process, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the other approaches, or all or a part of the technical solutions may be implemented in the form of a software product. The software product is stored in a storage medium and includes several instructions for instructing a terminal device (which may be a mobile phone, a tablet computer, a palmtop computer, a smartwatch, or a smart band) to perform all or a part of the steps of the methods described in the embodiments of this application. The foregoing storage medium includes any medium that can store program code, such as a universal serial bus (USB) flash drive, a removable hard disk, a read-only memory (ROM), a RAM, a magnetic disk, or an optical disc.

For same or similar parts in the embodiments in this specification, reference may be made to these embodiments, and each embodiment focuses on a difference from other embodiments. Especially, apparatus and software algorithm process embodiments are basically similar to a method embodiment, and therefore are described briefly, for related parts, reference may be made to partial descriptions in the method embodiment.

In conclusion, the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the present application.

What is claimed is:

1. A management method for a system, comprising:
   obtaining a first light intensity at a first moment and a second light intensity at a second moment according to a first interval period, wherein the second moment is later than the first moment;
   disabling a function of the system when the second light intensity is less than a first threshold, wherein the first light intensity is greater than the second light intensity;
   obtaining a third light intensity at a third moment according to a second interval period, wherein the third moment is later than the second moment; and
   enabling the function of the system when the third light intensity is greater than a second threshold.

2. The method according to claim 1, wherein a duration of the second interval period is greater than a duration of the first interval period.

3. The method according to claim 1, wherein the function comprises at least one of a screen display function, a gesture recognition function, a touch sensing function, or a fingerprint identification function.

4. The method according to claim 1, wherein the system is a smart watch or a phone.

5. The method according to claim 1, wherein each of the first light intensity, the second light intensity and the third light intensity is obtained by an ambient light sensor.

6. The method according to claim 1, further comprising:
   switching an interval of obtaining the third light intensity from the second interval period to the first interval period.

7. The method according to claim 1, further comprising:
   lighting a screen up in response to detecting a user wrist motion.

8. The method according to claim 1, wherein the first threshold is different from the second threshold.

9. An electronic device, comprising:
   at least one processor; and
   a memory coupled to the at least one processor and storing programming instructions that, when executed by the at least one processor, cause the electronic device to be configured to:
   obtain a first light intensity at a first moment and a second light intensity at a second moment according to a first interval period, wherein the second moment is later than the first moment;
   disable a function of the electronic device when the second light intensity is less than a first threshold, wherein the first light intensity is greater than the second light intensity;
   obtain a third light intensity at a third moment according to a second interval period, wherein the third moment is later than the second moment; and
   enable the function when the third light intensity is greater than a second threshold.

10. The electronic device according to claim 9, wherein a duration of the second interval period is greater than a duration of the first interval period.

11. The electronic device according to claim 9, wherein the function comprises at least one of a screen display function, a gesture recognition function, a touch sensing function, or a fingerprint identification function.

12. The electronic device according to claim 9, wherein the electronic device is a smart watch or a phone.

13. The electronic device according to claim 9, wherein each of the first light intensity, the second light intensity and the third light intensity is obtained by an ambient light sensor.

14. The electronic device according to claim 9, the memory further stores programming instruction that, when executed by the at least one processor, cause the electronic device to:
   switch an interval of obtaining the third light intensity from the second interval period to the first interval period.

15. The electronic device according to claim 9, the memory further stores programming instruction that, when executed by the at least one processor, cause the electronic device to:
   light a screen up in response to detecting a user wrist motion.

16. The electronic device according to claim 9, wherein the first threshold is different from the second threshold.

17. A non-transitory computer-readable storage medium comprising computer-readable program code stored therein that, in response to execution by a processor of an apparatus, cause the apparatus to perform operations comprising:
obtaining a first light intensity at a first moment and a second light intensity at a second moment according to a first interval period, wherein the second moment is later than the first moment;
disabling a function of the apparatus when the second light intensity is less than a first threshold, wherein the first light intensity is greater than the second light intensity;
obtaining a third light intensity at a third moment according to a second interval period, wherein the third moment is later than the second moment; and
enabling the function when the third light intensity is greater than a second threshold.

18. The non-transitory computer-readable storage medium according to claim 17, wherein a duration of the second interval period is greater than a duration of the first interval period.

19. The non-transitory computer-readable storage medium according to claim 17, wherein the function comprises at least one of a screen display function, a gesture recognition function, a touch sensing function, or a fingerprint identification function.

20. The non-transitory computer-readable storage medium according to claim 17, further comprising computer-readable program code stored therein that, in response to execution by a processor of an apparatus, cause the apparatus to perform operations comprising:
switching an interval of obtaining the third light intensity from the second interval period to the first interval period.

* * * * *